United States Patent
Sezgin et al.

(10) Patent No.: US 11,709,892 B2
(45) Date of Patent: Jul. 25, 2023

(54) SYSTEM AND METHOD FOR QUERYING A DATA REPOSITORY

(71) Applicant: Palantir Technologies Inc., Denver, CO (US)

(72) Inventors: Cenk Sezgin, London (GB); Advaya Krishna, New York, NY (US); Adhish Ramkumar, Jersey City, NJ (US); Arthur Wu, New York, NY (US); Adam Wiles, Hertfordshire (GB); Gregory Slonim, London (GB); Harsh Pandey, New York, NY (US); Kushal Nigam, Palo Alto, CA (US); Michal Adamczyk, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 150 days.

(21) Appl. No.: 17/235,428

(22) Filed: Apr. 20, 2021

(65) Prior Publication Data

US 2021/0279287 A1 Sep. 9, 2021

Related U.S. Application Data

(63) Continuation of application No. 16/362,104, filed on Mar. 22, 2019, now Pat. No. 10,984,051.

(30) Foreign Application Priority Data

Oct. 19, 2018 (GB) ..................................... 1817074

(51) Int. Cl.
  *G06F 7/00* (2006.01)
  *G06F 16/9032* (2019.01)
  (Continued)

(52) U.S. Cl.
  CPC .... *G06F 16/90328* (2019.01); *G06F 16/2393* (2019.01); *G06F 16/243* (2019.01);
  (Continued)

(58) Field of Classification Search
  CPC ............ G06F 16/90328; G06F 16/243; G06F 16/367; G06F 16/374; G06F 16/24575; G06F 16/2393
  (Continued)

(56) References Cited

U.S. PATENT DOCUMENTS 8,983,954 B2 3/2015 Platt et al.
2019/0005124 A1* 1/2019 Tripathi ............ G06F 17/30696

OTHER PUBLICATIONS

Anick et al. "Versioning a Full-text Information Retrieval System", ACM, 2 Penn Plaza, Suite 701—New York USA, Jun. 1992 (Jun. 1992), pp. 98-111.
(Continued)

*Primary Examiner* — Isaac M Woo
(74) *Attorney, Agent, or Firm* — Sheppard Mullin Richter & Hampton LLP

(57) ABSTRACT

The present disclosure relates to methods and systems for querying data in a data repository. According to a first aspect, this disclosure describes a method of querying a database, comprising: receiving, at a computing device, a plurality of keywords; determining, by the computer device, a plurality of datasets relating to the keywords; identifying, by the computer device, metadata for the plurality of datasets indicating a relationship between the datasets by examining an ontology associated with the datasets; providing, by the computer device, one or more suggested database queries in natural language form, the one or more suggested database queries constructed based on the plurality of keywords and the metadata; receiving, by the computing device, a selection of the one or more suggested database queries;
(Continued)

and constructing, by the computer device, an object view for the plurality of datasets based on the selected query and the metadata.

20 Claims, 6 Drawing Sheets

(51) Int. Cl.
  *G06F 16/242* (2019.01)
  *G06F 16/36* (2019.01)
  *G06F 16/2457* (2019.01)
  *G06F 16/23* (2019.01)
(52) U.S. Cl.
  CPC ...... *G06F 16/24575* (2019.01); *G06F 16/367* (2019.01); *G06F 16/374* (2019.01)
(58) Field of Classification Search
  USPC .................................................. 707/600–899
  See application file for complete search history.

(56) References Cited

OTHER PUBLICATIONS

Official Communication for European Patent Application No. 18196628.4 dated Nov. 13, 2018.

* cited by examiner

SYSTEM AND METHOD FOR QUERYING A DATA REPOSITORY

CROSS-REFERENCE TO RELATED APPLICATIONS

The application is a continuation of U.S. application Ser. No. 16/362,104, filed Mar. 22, 2019, now U.S. Pat. No. 10,984,051, which claims priority to United Kingdom Application No. 1817074.6, filed Oct. 19, 2018, each of which is incorporated herein by reference in its entirety.

FIELD

The present disclosure relates to methods and systems for querying data in a data repository. More particularly, this disclosure relates to methods and systems of suggesting queries based on an ontology.

BACKGROUND

Many large-scale data analytic systems use a large number of different datasets during their operation. These datasets may be related to one another in a structured way. Storing the relational data within the datasets themselves can result in a large increase in the size of the datasets, with a corresponding reduction in the performance of the analytic systems that operate on them.

Furthermore, large data repositories containing multiple datasets can be difficult for a user to interact with, for example by not being stored in a user friendly and immediately usable form. However, this data often needs to be queried quickly and easily by people who are not familiar with the underlying systems/models. Such people are generally non-coders, who need to construct sophisticated queries that relate to multiple disparate datasets in order to make informed decisions, but lack the requisite knowledge to be able to do so.

SUMMARY

According to a first aspect, this disclosure describes a method of querying a database, comprising: receiving, at a computing device, a plurality of keywords; determining, by the computer device, a plurality of datasets relating to the keywords; identifying, by the computer device, metadata for the plurality of datasets indicating a relationship between the datasets by examining an ontology associated with the datasets; providing, by the computer device, one or more suggested database queries in natural language form, the one or more suggested database queries constructed based on the plurality of keywords and the metadata; receiving, by the computing device, a selection of the one or more suggested database queries; and constructing, by the computer device, an object view for the plurality of datasets based on the selected query and the metadata.

The metadata may comprise an indication of one or more joins between the datasets in the plurality of datasets. The metadata may comprise one or more directional relationships between the datasets in the plurality of datasets. The metadata may comprise one or more of: synonyms for dataset titles, row and/or column titles; and/or an object property.

The plurality of keywords may comprise one or more of: object identities; actions; temporal ranges; geographic locations; numerical ranges; values; relationships; and/or reference numbers.

Determining the plurality datasets relating to the keywords may comprise identifying, using the ontology, datasets whose rows and/or columns comprise data labelled with a property relating to the keyword. The property may comprise one or more of: a row and/or column title; a dataset title; a flag provided in the ontology; a synonymous term to the keyword; and/or one or more classifications of the dataset.

Constructing an object view for the plurality of datasets based on the selected query and the metadata may comprise generating a computer readable database query based on the selected query and the metadata.

The method may further comprise outputting the computer readable database query via a user interface in an editable format.

Constructing an object view for the plurality of datasets based on the selected query and the metadata may comprise generating a table from the plurality of datasets based on the selected query and the metadata by joining at least a subset of data from each of the identified tables.

Constructing an object view for the plurality of datasets based on the selected query and the metadata may comprise applying one or more filters to one or more of the plurality of datasets based on the selected query and the metadata.

The object view may comprise one or more of: a table; a histogram; a bar graph; a line graph; a scatter graph; and/or a pie chart.

The method may further comprise outputting the object view for the plurality of datasets to a user interface.

According to a second aspect, this disclosure describes a system comprising: a user interface; a query builder module; a data repository comprising a plurality of datasets; and an ontology comprising metadata indicative of relationships between the plurality of datasets, wherein the system is configured to perform any of the methods described herein.

According to a third aspect, this disclosure describes a system comprising: a user interface; a query builder module; a data repository comprising a plurality of datasets; and an ontology comprising metadata indicative of relationships between the plurality of datasets, wherein the system is configured to: receive, via the user interface, a plurality of keywords; determine, by the query builder, a plurality of datasets relating to the keywords; identify, by the query builder, metadata for the plurality of datasets indicating a relationship between the datasets by examining the ontology associated with the datasets; provide, by the query builder, one or more suggested database queries in natural language form, the suggested queries constructed based on the plurality of keywords and the metadata; receive, via the user interface, a selection of the one or more suggested database queries; and construct, by the query builder, an object view for the plurality of datasets based on the selected query and the metadata.

According to a fourth aspect, this disclosure describes a computer program comprising computer readable instructions that, when executed by a computing apparatus, cause the computing apparatus to perform any of the methods described herein.

According to a fifth aspect, this disclosure describes a non-transitory computer readable medium having computer readable code stored thereon, the computer readable code, when executed by at least one processor of a computing device, causing performance of the steps of: receiving, at the computing device, a plurality of keywords; determining, by the computer device, a plurality of datasets relating to the keywords; identifying, by the computer device, metadata for the plurality of datasets indicating a relationship between the datasets by examining an ontology associated with the datasets; providing, by the computer device, one or more suggested database queries in natural language form, the suggested queries constructed based on the plurality of keywords and the metadata; receiving, by the computing device, a selection of the one or more suggested database queries; and constructing, by the computer device, an object view for the plurality of datasets based on the selected query and the metadata.

According to a sixth aspect, this disclosure describes an apparatus comprising one or more processors or special-purpose computing hardware configured to perform any of the methods described herein.

According to a seventh aspect, this disclosure describes an apparatus comprising: one or more processors; and a memory, the memory comprising instructions that, when executed by one or more processors, cause the apparatus to perform the steps of: receiving a plurality of keywords; determining a plurality of datasets relating to the keywords; identifying metadata for the plurality of datasets indicating a relationship between the datasets by examining an ontology associated with the datasets; providing one or more suggested database queries in natural language form, the suggested queries constructed based on the plurality of keywords and the metadata; receiving a selection of the one or more suggested database queries; and constructing an object view for the plurality of datasets based on the selected query and the metadata.

BRIEF DESCRIPTION OF THE DRAWINGS

Example embodiments will now be described by way of non-limiting example with reference to the accompanying drawings, in which.

DETAILED DESCRIPTION

Figure 1:
FIG. 1 shows an example database querying system.

FIG. 1 shows a schematic example of a data aggregation and processing system. The system 100 comprises a data repository 102 comprising one or more of datasets 104. The system 100 further comprises an ontology layer 106 comprising an ontology for interpreting datasets 104 in the data repository 102. A query builder 108 is provided that builds queries for querying datasets 104 in the data repository 102 based on the ontology layer 106 and keywords input via a user interface 110. The query builder 108 may act as a translator from keyword/natural language input to database queries, and vice versa.

The data repository 102 comprises one or more datasets 104. The each of the one or more datasets comprises data representing objects. The data repository may contain a plurality of datasets 104. The datasets may be in a table format, the tables comprising one or more rows and one or more columns of objects. The datasets 104 may comprise relational databases.

The data repository 102 may be a distributed data repository, with the datasets 104 comprising the data repository 102 being stored at a plurality of locations. One or more of the datasets 104 may be under control of one or more different entities. The datasets 104 may be edited by the entities that control them, for example to update the data in the dataset in light of new measurements and/or surveys. The datasets 104 may relate to/originate from one or more systems that generate data.

An object may refer to a thing/a grouping of things with a given set of properties. An object may reference tangible/intangible things and/or animate/inanimate things. As non-limiting examples, an object may refer to persons, vehicles, portions of a vehicle, buildings, portions of buildings, investigations, portions of an investigation, schedules, or rights/demands for rights, physical sensor data, and/or other things. Other types of objects are contemplated.

A definition of an object may describe the object by specifying/identifying one or more properties (e.g. characteristics) of the object. For example, an object may include a person and a definition of the object may describe the person by specifying/identifying particular properties (e.g. gender, height, weight, education, occupation, address, phone number) of the person. The values of the properties may be stored in one or more columns and/or rows of a database as strings, numbers and/or other forms of expression. The definition of the object may identify the particular columns and/or rows of the database storing the relevant values of the properties of the object. In some embodiments, a given property of an object may be derived from one or more values of datasets. For example, a given property of an object may be determined based on multiple values within one or more tables.

An object may be related to one or more other objects. Relationships among objects may be between objects of the same type (e.g. relationships between people objects, such as between family members, co-workers, persons who have interacted with each other) and/or between objects of different types (e.g. relationships between a person object and a non-person object, such as between a person and a schedule, a person and an investigation). For example, objects representing individual investigations (e.g. of accidents, of claims, of demand for rights) may be related to an object representing a group of investigations (e.g. based on commonalities, based on a user input). Such relationships may effectuate grouping individual investigations into groups of investigations. As another example, objects representing individual investigations may be related to an object representing persons (e.g. persons associated with investigations). Relationships between objects may include one-to-one relationships, one-to-many relationships, many-to-one relationships, many-to-many relationships, and/or other relationships.

The ontology layer 106 provides an ontology for interpreting objects in the data repository. Data defined in the ontology is herein described as "ontological data" and/or "metadata". The ontology may comprise an object graph in a separate metadata-layer that sits on top of underlying datasets is provided. This indicates the relationships between the datasets, as well as metadata indicating default settings for displaying that data, such as the display prominence. The ontology data can be input by the user via a data aggregation and processing system, or can be generated automatically by the system, for example based on the frequency that particular data columns occur across multiple datasets.

An ontology may define aspects of objects, such as how properties of an object may be presented and/or modified. For example, an ontology may include a person object type including a name property, and the ontology may define how the name may be presented (e.g. first name followed by last name; last name followed by first name; first name followed by initial). The ontology may define a display prominence of an object. For example, the object may be assigned a "Prominent", "Normal" or "Hidden" display prominence. Prominent objects can be rendered before normal properties when displaying a portion of the properties. Normal objects may be assigned no special prominence in the display order. Hidden objects may not be displayed.

The ontology may define how/whether the name may be modified (e.g. based on user input, based on user account privileges). As another example, a definition of a person may include one or more relationship properties and the ontology may define how/whether the relationships may be presented and/or modified. In some embodiments, an ontology may define whether/how properties of an object may be created and/or removed. For example, an ontology may define whether a user may add or remove one or more properties of the person object type. The definitions/ontologies may be created based on user input. The definitions/ontologies may be modified (e.g. based on user input, based on system changes).

The ontology layer 106 may define how one or more of the datasets 104 in the data repository 102 are related. For example, the ontology may define joins between datasets 104 in the data repository 102. Joins may comprise links between the data to allow for multiple datasets to be navigated and/or searched as if they were a single dataset. The ontology may further comprise directional relationships between datasets. For example, a dataset relating to "repairs" may have a directional relationship to a dataset of "employees", the directional relationship being "performed by". The ontology layer 106 may further comprise synonyms for dataset titles, row and/or column titles, and/or objects in the datasets.

In some embodiments, the ontology comprises one or more global properties. Global properties indicate objects/object types/object properties that are common throughout the ecosystem of datasets. The global properties allow for metadata in the metadata layer to be associated with a plurality of objects/object types/object properties in the datasets without the need to explicitly associate the objects/object types/object properties with that metadata. This can reduce the amount of memory required to store the datasets and the associated metadata. It can further allow for aggregation across datasets/tables with the same global property.

The global property may define a particular format or particular formats of data that will be associated with a set of metadata. For example, a global property "telephone number" can be set up that defines one or more data formats that telephone numbers can be provided in (for example, as a continuous sequence of numbers, a sequence of numbers with spaces at particular points, and/or a sequence of numbers with a subset of the numbers enclosed in brackets). Data falling within the definition will then be associated with the global property "telephone number", as well as the metadata associated with global property "telephone number".

Ontologies may be defined via a user interface 110 and stored in the ontology layer 106.

Ontologies may be defined automatically by the ontology layer 106. Ontological data may be prepopulated based on properties of the one or more datasets 104 in the data repository 102. For example, the ontology layer 106 may scan across one or more of the datasets 104 to determine/predict any relationships between objects in the dataset and/or a display prominence for one or more objects in the datasets 104. For example, the fraction of column/row values in a column/row that contain a unique value can be used as an indication of the importance of that column/row. The importance of the column/row can be used to determine a display prominence for objects in that column/row. In a further example, the cardinalities of a column/row can be used to determine the possible display mode for displaying data in that column/row (e.g. which graph types the data can be displayed as).

The system 100 further comprises a query builder module 108. The query builder module 108 is configured to receive one or more input keywords from the user interface 110, and to use them to generate a query for data in the data repository 102 in conjunction with the ontology layer 106.

Keywords may comprise, for example, one or more of: object identities; actions; temporal ranges; geographic locations; and/or relationships. Many other examples of keywords are possible.

Upon receipt of a keyword from the user interface 110, the query builder is configured to identify one or more sets datasets that relate to the received keyword. A set of datasets comprises one or more datasets. The query builder 108 may examine the ontology to determine properties of the keyword in order to identify the one or more sets of datasets. The identified properties may be used to identify one or more sets of datasets that relate to the keyword. In some examples, the ontology may be used to determine that the keyword relates to a general property and/or to a class of objects.

Based on properties of the keyword, the query builder may be configured to identify one or more sets datasets that relate to the received keyword. For example, the ontology may be used to identify datasets that relate to properties of the input keyword, such as datasets whose rows and/or columns comprise data labelled with a property relating to the keyword. Examples of such properties include, but are not limited to: row and/or column titles; dataset titles; flags provided in the ontology; synonymous terms to the keyword; and/or classifications of datasets.

The query builder may identify the one or more sets of datasets that comprise datasets that comprise objects belonging to an identified class of the keyword and/or having an identified general property of the keyword. If a keyword belongs to a particular class of objects, datasets that comprise that class of objects and which comprise the keyword may be identified. For example, if the keyword is "Canada", the query builder uses the ontology to determine that Canada belongs to the class "Country" and/or "Region", and identifies datasets that comprise rows and/or columns that are tagged with the property "Country" and/or "Region" and which contain the term "Canada".

A plurality of sets of datasets may be identified based on the input keyword. For example, continuing with the example of the keyword input being "Canada", a set of datasets comprising people with the country Canada may be identified, a set of datasets comprising measurements taken in the region Canada, etc. Each of these sets of datasets may be presented to the user for selection through the user interface 110 in order to identify the set of datasets that the user is intending to query.

Not every input keyword may relate to a dataset. One or more of the received keywords may relate to one or more operations to be performed on the dataset. For example, the keywords may comprise operations such as: one or more filters; maximum; minimum; average; mean; median; mode and/or range. However, the keywords relating to these operations may also relate to datasets (for example, a dataset may contain a column and/or row labelled as an average). In these examples, as well as each of the identified sets of datasets being presented to the user for selection through the user interface, one or more operations on sets of datasets may also be provided for selection by the user via the user interface 110.

As datasets are identified based on the received keywords, the query builder 108 examines the ontology layer 106 and analyses potential relationships between the identified datasets using ontological data in the ontology layer 106 that is associated with the identified datasets.

As an example, directional relationships between datasets may be provided in the ontology. One or more joins between the datasets in the plurality of datasets may be identified by the ontology and/or inferred based on a directional relationship. The ontology may indicate synonyms for dataset titles, row and/or column titles. The ontology may comprise object properties and/or classes.

The query builder 108 is configured to suggest one or more queries based on the relationships identified from the ontology layer 106. The one or more suggested queries are output to the user interface 110 in natural language form. The natural language query may, for example, be based on templates stored in the ontology. In some examples, the natural language query is built using the relationships stored in the ontology. Rules-based methods may be used to generate the natural language query from the input keywords. In some examples, neural machine learning translation models can be used. Other methods that may be used to generate the natural language query from the keywords include parse trees and/or name entity recognition.

In some examples, the natural language query may be constructed by selecting a natural language template from a library of templates based on properties of the keywords. The natural language template may be populated using slot-filling techniques. For example, the natural language template may comprise a sequence of words and "slots". The slots can be populated using the keywords based on properties of the keywords in order to generate the natural language query.

For example, a user may wish to view all of the repairs performed in a particular country on a particular car model. The user may input a first keyword, in this example "repairs". One or more datasets relating to the first keyword are identified using the ontology, e.g. datasets relating to the keyword "repairs" are identified using the ontology. A suggested query is output in natural language form, e.g. "Show me repairs".

The user may then input a second keyword. Continuing with the repair example, the second keyword may be a car brand, e.g. "XYZ". One or more datasets relating to the second keyword are identified using the ontology, e.g. datasets relating to the keyword "XYZ" are identified using the ontology. The suggested query in natural language form is updated, e.g. "Show me repairs done on Cars with Brand XYZ".

The user may then input further keywords. Each time a further keyword is input, one or more datasets relating to that keyword are identified. The suggested query in natural language form is updated as each new dataset is identified. Continuing with the repair example, a further keyword may be a location, e.g. "Sweden". One or more datasets relating to the keyword "Sweden" are identified using the ontology.

The suggested query in natural language form is updated to read "Show me repairs done on Cars with Brand XYZ performed in Sweden".

In some embodiments, the ontology may indicate that a keyword input may have multiple potential interpretations and/or relationships with datasets identified based on previous keywords. These potential options for interpreting the keyword may be provided through the user interface 110 for selection by a user. The suggested query will be updated accordingly. For example, continuing with the repair example from above, the keyword "Sweden" and be associated in the ontology with datasets containing "People with Country that contains Sweden", "People with Job Title that Contains Sweden" and "performed in Country Sweden". When the keyword "Sweden" is input, a drop-down menu may be provided allowing the user to select one of these options.

The query builder 108 is further configured to receive a selection of the one or more suggested queries from the user interface 110. Based on the selected query, the query builder generates code for a database query. The code for the database query is operable to generate an object from the datasets 104 in the data repository 102 that may be used to answer the query. For example, the code for the database query, when executed, may cause the system to generate a joined table comprising the relevant parts of the datasets 104 identified based on the input keywords.

The code may be generated using machine translation techniques, such as neural machine translation and/or deep learning. For example, a neural network may be trained on a training set comprising known natural language queries and/or keywords with known corresponding code for a database query. Ontology data may also be used as an input to the neural network. Long Short-Term Memory networks are one example of a neural network that can be used for this translation.

The generated code may comprise code that is operable to generate a particular object view of the identified datasets. This code may be generated based on the ontological data for the identified datasets that is present in the ontology. The code may, for example, be: Python code; C++ code; or SQL code.

The generated code may comprise one or more filters on the datasets that are based on the input keywords. For example, the filters may filter datasets using one or more of the received keywords to remove entries that do not contain those keywords.

The generated code may comprise one or more operations on the datasets that are based on the input keywords. For example, the input keywords may include keywords that indicate operations to be performed on the datasets. For example, the keywords may comprise operations such as: maximum; minimum; average; mean; median; mode and/or range.

The database query may be sent to one or more analysis tools for use in analysing the datasets 104. In some examples, the analysis tool may be provided with the code in an editable format. This allows a user to examine and/or modify the code, for example in troubleshooting.

The system additionally comprises a user interface 110, for example in the form of a graphical user interface. The user interface allows a user to interact with the system, for example to input keywords, interact with objects stored in the datasets stored in the data repository and/or to edit the ontology. As an example of a user interaction, the user may input a search request into the system via the user interface.

Objects returned by the search request may be viewed through the user interface. A list of objects meeting the search criteria can be displayed on the user interface. The user may select one or more the objects to view and/or interact with.

The system can be used by multiple users at once, each interacting with the system through a user interface on a different device. Where multiple users attempt to edit a dataset at the same time, vector clocks and resolution strategies can be used to resolve the conflicts.

Figure 2:
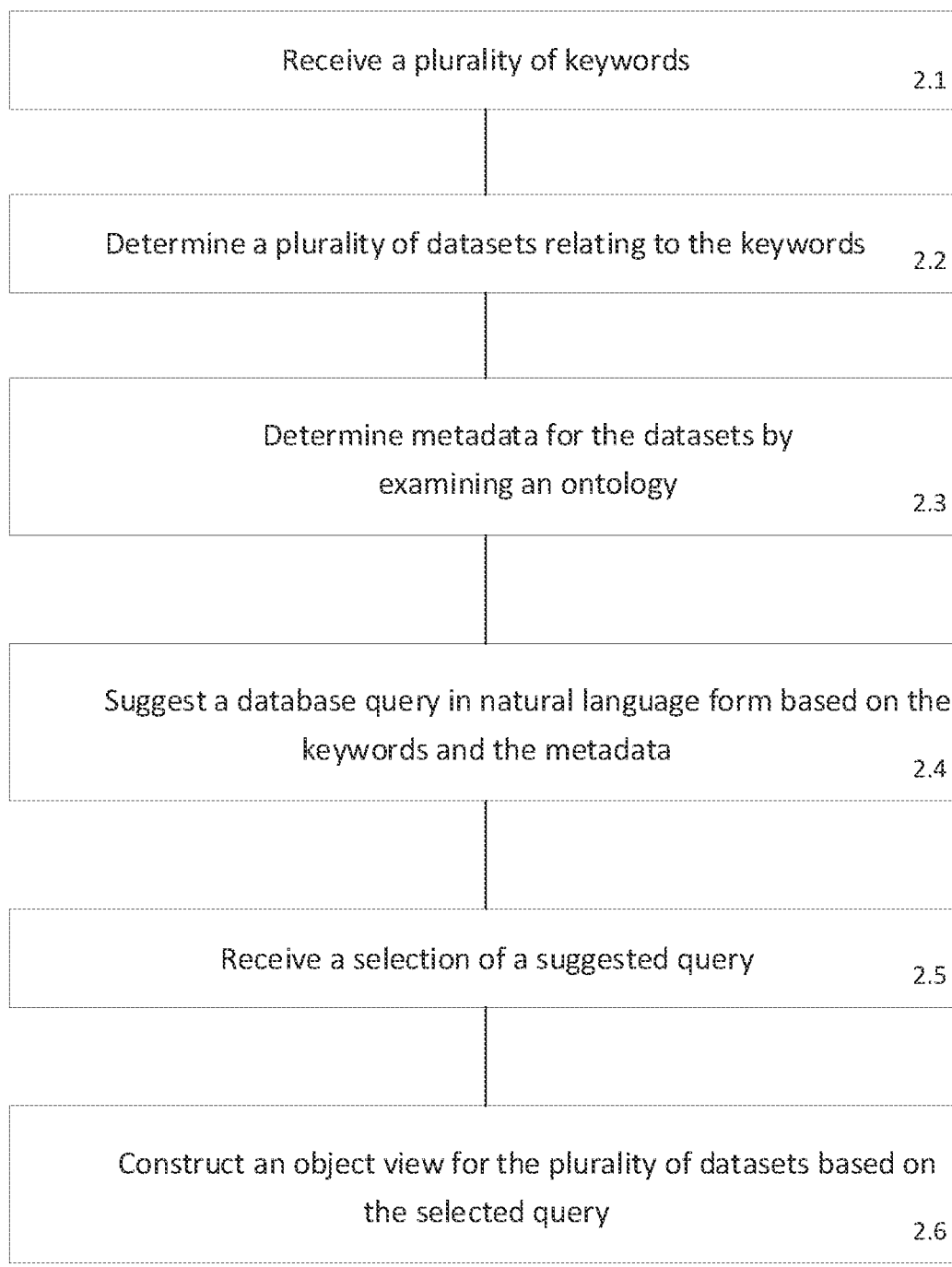
FIG. 2 shows a flow diagram of an example method of querying a database.

FIG. 2 shows an example flow diagram of a method of querying a database.

At operation 2.1, a plurality of keywords is received. A user may input a plurality of keywords through a user interface 110 into the system 100. The keywords may be input one at a time, with operation 2.2 performed for each keyword as it is entered. Alternatively, the keywords may be input together as one query, with operation 2.2 being performed once all keywords have been entered.

At operation 2.2, a plurality of datasets relating to the plurality of keywords is determined.

Determining the plurality of datasets may be performed while the plurality of keywords is being entered. For example, after a first keyword is received, the query builder 108 determines one or more initial datasets, those initial datasets relating to the received first keyword. The first keyword may relate to a plurality of datasets, with a selectable list of the relevant datasets being provided to the user for selection of the one or more initial datasets.

The user may then enter a second keyword. The query builder 108 then determines one or more further datasets, the further datasets relating to the received second keyword. The second keyword may relate to a plurality of datasets, with a selectable list of the relevant datasets being provided to the user for selection of the one or more further datasets. The process may continue with further received keywords, resulting in additional datasets being determined.

In some embodiments, the plurality of keywords may be received together. The query builder 108 may determine the plurality of relevant datasets based on knowledge of the whole of the plurality of received keywords.

At operation 2.3, metadata for each of the datasets is determined by examining the ontology layer 106. As datasets are identified based on the received keywords, the query builder 108 examines the ontology layer 106 and analyses potential relationships between the identified datasets using ontological data/metadata in the ontology layer 106 that is associated with the identified datasets.

At operation 2.4, a database query is suggested in natural language based on the received keywords and the metadata. One or more queries may be suggested. The natural language query may, for example, be based on templates stored in the ontology. In some examples, the natural language query is built using relationships between the identified datasets that are stored in the ontology.

The suggested queries may be provided in a list. The list may be ordered by a likelihood of the suggested query matching the input keywords. In some examples, only one suggested query is provided.

In some examples, the user may edit and/or reject a suggested query. Editing the suggested query may result in a flag be placed in the ontology, indicating that the ontology should be enriched to include features relating to that query.

At operation 2.5, a selection of a suggested query is received. The selection of a suggested query may be received through the user interface 110.

In some examples, the user may have the option to reject the suggestions provided by the query builder. This can act as a flag to a system administrator that the ontology needs to be enriched.

At operation 2.6, an object view for the plurality of datasets is constructed based on the selected query. Constructing an object view for the plurality of datasets based on the selected query and the metadata may comprise generating a computer readable database query based on the selected query and the metadata. The computer readable database query may, for example, be generated in a particular database querying language, such as SQL. Other languages may alternatively be used, such as Python or C++.

The computer readable database query may be output via the user interface 110 in an editable format. The user may then edit the code manually in order to, for example, optimise the code, adjust parameters in the code and/or correct the code.

Constructing an object view for the plurality of datasets may alternatively or additionally comprise generating a table from the plurality of datasets based on the selected query and the metadata. Data and/or subsets of data from each of the identified datasets may be joined together using joins indicated in the ontology in order to create a joined dataset. The joined dataset may be output as the object view.

Constructing an object view for the plurality of datasets may alternatively or additionally comprise applying one or more filters to one or more of the plurality of datasets based on the selected query and the metadata. The selected query may indicate that the user is interested in data satisfying certain conditions. These conditions may be applied when generating the object view in order to filter out data from the plurality of datasets that may answer the user's query.

The object view may be provided in a number of formats. The ontology may indicate how the objects may be viewed, for example by providing a hierarchy of object views for data in the datasets, as described above. The object views may, for example, comprise one or more of: a table; a histogram; a bar graph; a line graph; a scatter graph; and/or a pie chart.

The object views may be output via the user interface 110. The user may interact with the object view in the user interface 110, for example to change the object view. Changing the object view may comprise: zooming in/out of the object view; scrolling through data in the object view; changing the representation of the object (e.g. changing form a table to a graph). Many other examples are possible.

Figure 3:
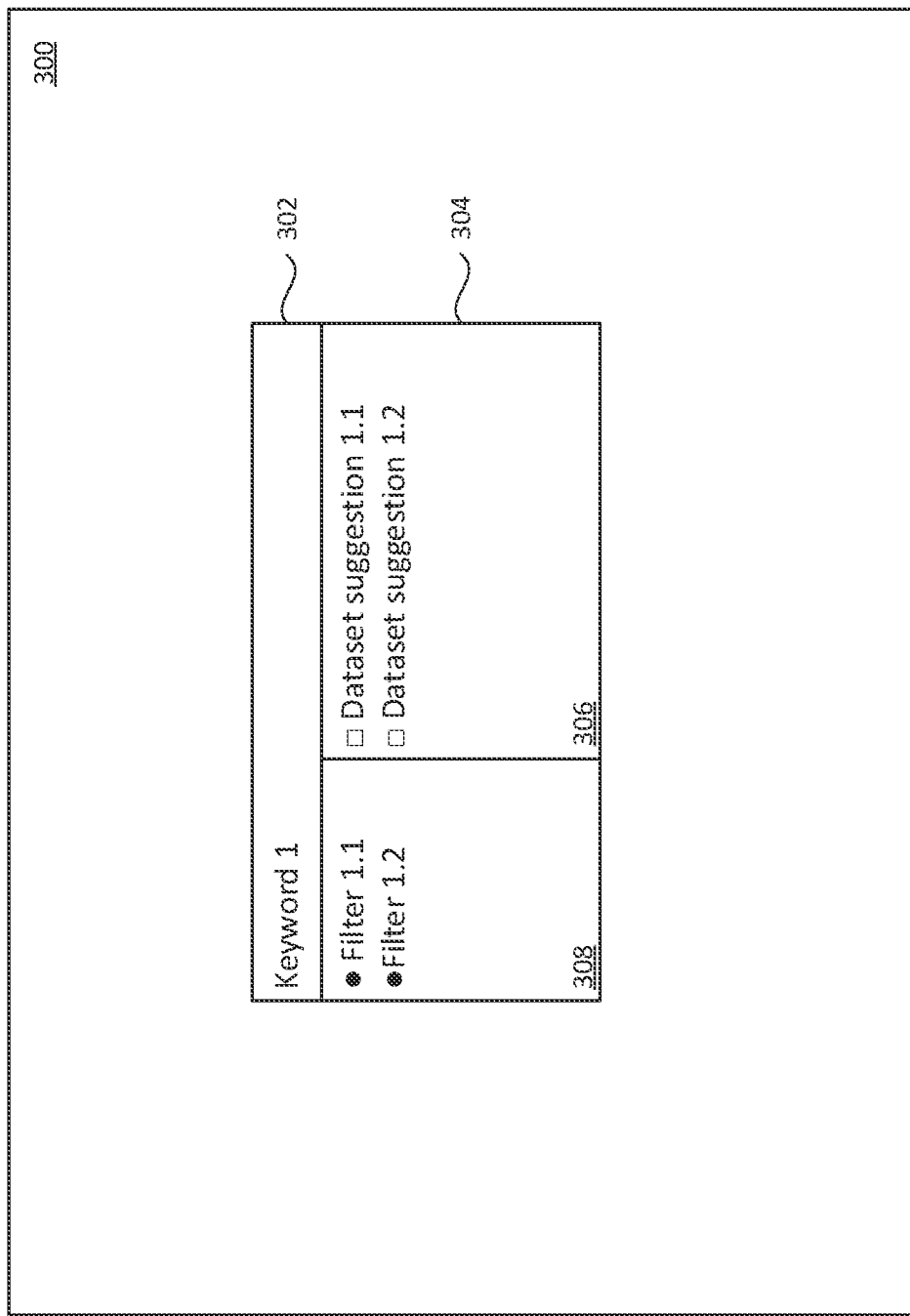
FIG. 3 shows an example of a graphical user interface for querying a database.

FIG. 3 shows an example of a graphical user interface 300 for querying a database. The graphical user interface comprises a search bar 302 for receiving user input keywords. In the example shown, a first keyword is input into the search bar 302.

In response to input of a keyword into the search bar 302, a drop-down menu 304 may appear on the user interface. The drop-down menu comprises a list of one or more suggested sets of datasets 306 based on the input keyword. In the example shown, the list of suggested datasets 306 has two suggested sets datasets, but in general any number of datasets may be suggested. The suggested datasets 306 may be based on metadata determined by examining an ontology layer 106. The metadata may, for example, indicate synonyms for the input keyword. Datasets comprising rows and/or columns having titles or properties associated with the keyword and/or the synonyms of the keyword may be suggested. Datasets having a title comprising the keyword and/or the synonyms of the keyword may alternatively or additionally be suggested.

The drop-down menu 304 may further comprise one or more filters 308. The one or more filters 308 are operable to filter the suggested datasets 306. The available filters 308 may be provided based on properties of the suggested datasets 306. For example, one or more of the suggested datasets 306 may belong to a particular class of dataset, as indicated in the ontology. This class may be provided as a filter. As another example, one or more of the suggested datasets 306 may have one or more properties associated with them, as indicated in the ontology. These properties may be provided as filters.

A user may select one or more of the filters 308. In response to the selection of a filter, the list of suggested datasets 306 may be reduced to only the datasets that satisfy the selected one or more filters.

Other features may be provided in the graphical user interface, but are not shown in FIG. 3. For example, standard menus and menu options may be provided in a taskbar.

Figure 4:
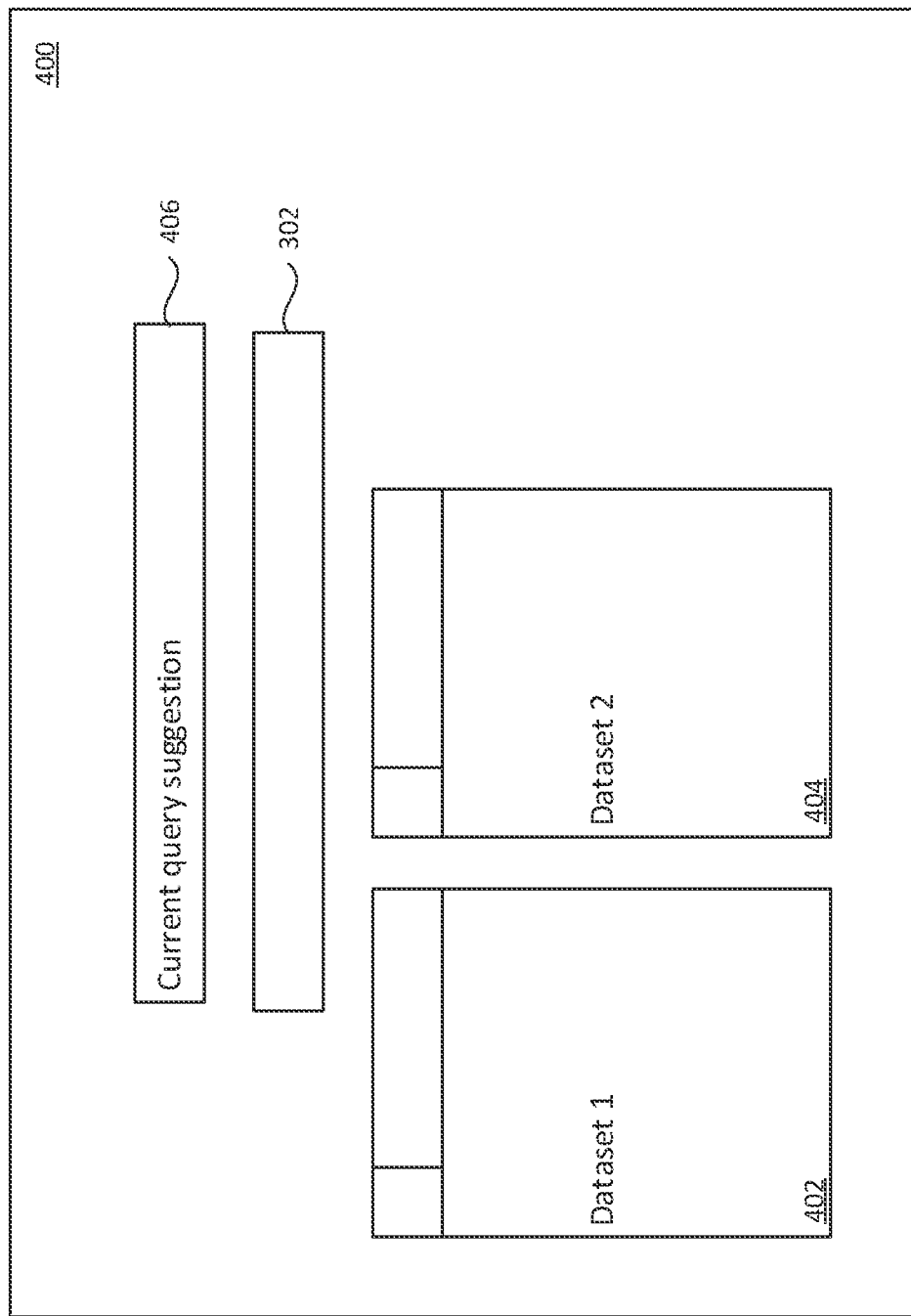
FIG. 4 shows an example of a graphical user interface after a plurality of datasets have been selected.

FIG. 4 shows an example of a graphical user interface 400 after a plurality of datasets have been selected. The graphical user interface comprises a search bar 302 for receiving user input keywords, as described in relation to FIG. 3.

The graphical user interface 400 further comprises one or more sets of datasets 402, 404 (in this example, two sets datasets 402, 404 are shown, though in general any number of datasets may be shown). The sets of datasets 402, 404 are sets of datasets previously selected by a user upon inputting one or more keywords into the search bar.

The graphical user interface further comprises a current query suggestion 406. The current query suggestion 406 is a natural language form. The suggested query is based on examining the metadata ontology associated with the selected datasets 402, 404.

For example, the first dataset 402 may relate to car repairs, based on a keyword input of "repairs". The second dataset may relate to the country "Sweden" based on a keyword input of "Sweden". Using the ontology, the query builder generates the natural language suggested query "Show me repairs performed in country Sweden". This suggested query is based on the directional relationship "performed in" between the keyword "repair" and keywords tagged in the ontology with the term "country".

Figure 5:
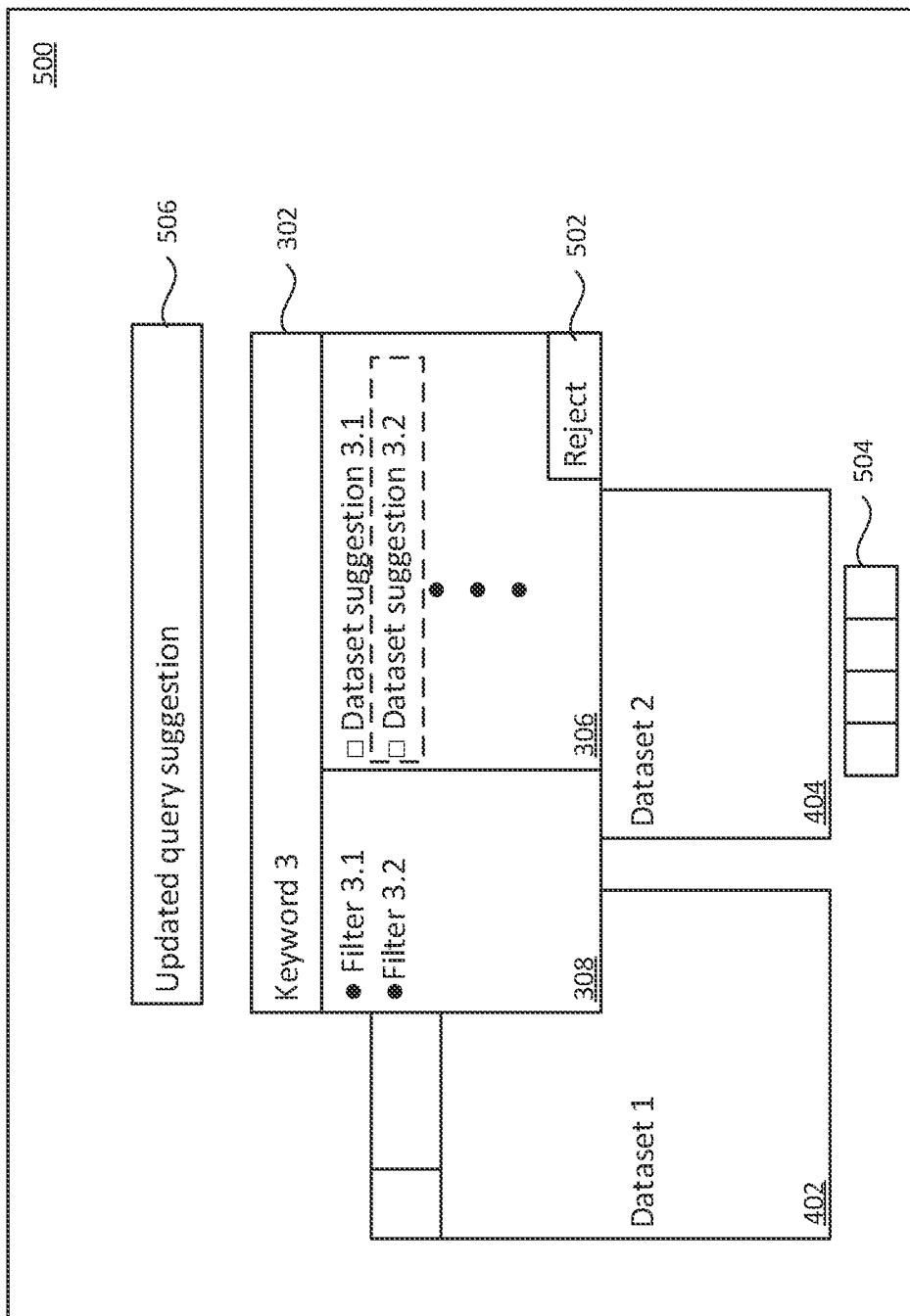
FIG. 5 shows an example of a graphical user interface during input of a further keyword.

FIG. 5 shows an example of a graphical user interface 500 during input of a further keyword.

A third keyword is input into the search bar 302. In response to input of the further keyword into the search bar 302, the drop-down menu 304 may appear on the user interface. The drop-down menu comprises a list of one or more suggested sets of datasets 306 based on the input further keyword, as described in relation to FIG. 3. The drop-down menu 304 may further comprise one or more filters 308, as described in relation to FIG. 3. The previously identified datasets 402, 404 are still present in the graphical user interface 500.

In response to the selection of one of the suggested sets of datasets from the drop-down menu (in this example illustrated by the dashed box), the suggested query may be updated to provide an updated suggested query 506. The query may be updated when the set of datasets is selected. Alternatively, it may be updated when the user hovers over the suggestion with a cursor and/or highlights the suggested set of datasets.

In some examples, the drop-down menu may comprise a rejection button 502. The rejection button 502 can be used to indicate that none of the suggested sets of datasets satisfy the requirements of the user. A rejection can be logged by the system, and used to indicate to a system manager that the ontology needs enriching.

In this example, the user interface further comprises a query toolbar 504. The query toolbar allows the user to interact with the selected sets of datasets and/or the suggested query. For example, the query toolbar 504 may comprise a button that initialises the conversion of the suggested query into a computer readable database query, i.e. to generate computer code based on the suggested query.

Figure 6:
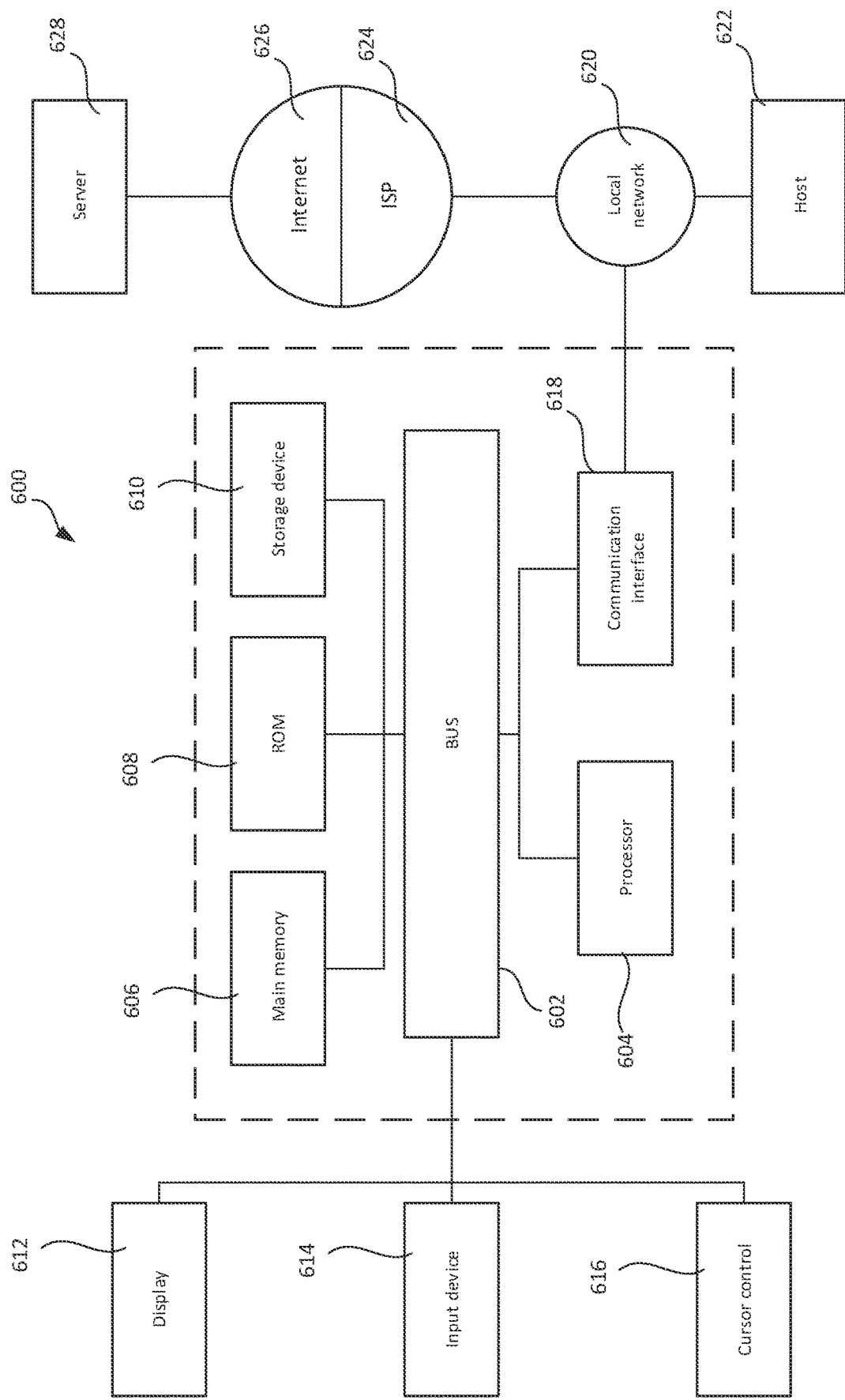
FIG. 6 shows a block diagram of an exemplary computer system.

Referring to FIG. 6, a block diagram of an exemplary computer system, which may comprise the data repository 102, ontology layer 106, and/or query builder 108, consistent with examples of the present specification is shown.

Computer system 600 includes a bus 602 or other communication mechanism for communicating information, and a hardware processor 604 coupled with bus for processing information. Hardware processor 604 can be, for example, a general purpose microprocessor. Hardware processor 604 comprises electrical circuitry.

Computer system 600 includes a main memory 606, such as a random access memory (RAM) or other dynamic storage device, which is coupled to the bus for storing information and instructions to be executed by processor. The main memory 606 can also be used for storing temporary variables or other intermediate information during execution of instructions by the processor 604. Such instructions, when stored in non-transitory storage media accessible to the processor, render the computer system 300 into a special-purpose machine that is customized to perform the operations specified in the instructions. The main memory 606 may be referred to as volatile memory.

Computer system 600 further includes a read only memory (ROM) 608 or other static storage device 610 coupled to the bus for storing static information and instructions for the processor 604. A storage device 610, such as a magnetic disk or optical disk, is provided and coupled to the bus for storing information and instructions.

Computer system 600 can be coupled via the bus to a display 612, such as a cathode ray tube (CRT), liquid crystal display, or touch screen, for displaying information to a user. An input device 614, including alphanumeric and other keys, is coupled to the bus 602 for communicating information and command selections to the processor 604. Another type of user input device is cursor control 616, for example using a mouse, a trackball, or cursor direction keys for communicating direction information and command selections to the processor and for controlling cursor movement on the display. The input device 616 typically has two degrees of freedom in two axes, a first axis (for example, x) and a second axis (for example, y), that allows the device to specify positions in a plane.

Computer system 600 can implement the techniques described herein using customized hard-wired logic, one or more ASICs or FPGAs, firmware and/or program logic which in combination with the computer system causes or programs computer system to be a special-purpose machine. According to some embodiments, the operations, functionalities, and techniques disclosed herein are performed by computer system in response to the processor executing one or more sequences of one or more instructions contained in the main memory. Such instructions can be read into the main memory from another storage medium, such as storage device. Execution of the sequences of instructions contained in main memory causes the processor to perform the process steps described herein. In alternative embodiments, hardwired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus. Transmission media can also take the form of acoustic or light waves, such as those generated during radio-wave and infra-red data communications.

Various forms of media can be involved in carrying one or more sequences of one or more instructions to processor for execution. For example, the instructions can initially be carried on a magnetic disk or solid state drive of a remote computer. The remote computer can load the instructions into its dynamic memory and send the instructions over a telephone line or other transmission medium using a modem. A modem local to computer system can receive the data on the telephone line or other transmission medium and use an infra-red transmitter to convert the data to an infra-red signal. An infra-red detector can receive the data carried in the infra-red signal and appropriate circuitry can place the data on bus. Bus carries the data to the main memory, from which the processor retrieves and executes the instructions. The instructions received by the main memory can optionally be stored on the storage device either before or after execution by the processor.

Computer system also includes a communication interface 618 coupled to the bus 602. The communication interface provides a two-way data communication coupling to a network link that is connected to a local network 620. For example, the communication interface can be an integrated services digital network (ISDN) card, cable modem, satellite modem, or a modem to provide a data communication connection to a corresponding type of telephone line. As another example, the communication interface 618 can be a local area network (LAN) card to provide a data communication connection to a compatible LAN. Wireless links can also be implemented. In any such implementation, the communication interface 518 sends and receives electrical, electromagnetic or optical signals that carry digital data streams representing various types of information.

The network link typically provides data communication through one or more networks to other data devices. For example, the network link can provide a connection through the local network 620 to a host computer 622 or to data equipment operated by an Internet Service Provider (ISP) 624. The ISP 624 in turn provides data communication services through the world wide packet data communication network now commonly referred to as the "Internet" 626. The local network 620 and internet 626 both use electrical, electromagnetic or optical signals that carry digital data streams. The signals through the various networks and the signals on the network link and through the communication interface, which carry the digital data to and from the computer system, are example forms of transmission media.

The computer system can send messages and receive data, including program code, through the network(s), network link and communication interface. For example, a first application server may transmit data through the local network to a different application server 628.

Methods described in the illustrative embodiments may be implemented as program modules or functional processes including routines, programs, objects, components, data structures, etc., that perform particular tasks or implement particular functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example embodiments may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fibre, or other suitable transmission medium known in the art. The example embodiments are not limited by these aspects in any given implementation.

It will be appreciated that many modifications may be made to the embodiments hereinbefore described. Such modifications may involve equivalent and other features which are already known in automated monitoring and control of machinery, and which may be used instead of or in addition to features already described herein. Features of one embodiment may be replaced or supplemented by features of another embodiment.

In the above detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although claims have been formulated in this application to particular combinations of features, it should be understood that the scope of the disclosure of the present disclosure also includes any novel features or any novel combination of features disclosed herein either explicitly or implicitly or any generalization thereof, whether or not it relates to the same disclosure as presently claimed in any claim and whether or not it mitigates any or all of the same technical problems as does the present disclosure.

The invention claimed is:

1. A computer-implemented method comprising:
receiving, by a computing system, a keyword with which to search a plurality of datasets;
identifying, by the computing system, datasets in the plurality of datasets that are related to the keyword based on ontologies associated with the datasets;
prompting, by the computing system, a selection, by a user, of one or more datasets from the identified datasets;
receiving, by the computing system, the selection of the one or more datasets;
inferring, by the computing system, relationships among the selected datasets, the relationships comprising one or more common subcategories among the selected datasets;
suggesting, by the computing system, based on the keyword and the inferred relationships, one or more search queries with which to search the datasets, the suggesting comprising:
generating logic to translate the keyword into the one or more search queries based on the inferred relationships; and
generating the one or more search queries based on the inferred relationships;
receiving, by the computing system, through the user interface, a selection of a query from the one or more queries; and
generating, by the computing system, through the user interface, an object view for the datasets based on the selected query, wherein the object view is a relational database that is generated from the datasets.

2. The method of claim 1, wherein the plurality of datasets is stored in a distributed data repository and the distributed data repository stores the plurality of datasets at a plurality of locations.

3. The method of claim 1, wherein the ontologies associated with the datasets include one or more of: text associated with rows, columns, or objects in the datasets; rules with which to modify rows, columns, or objects in the datasets; formats that define columns, or objects in the datasets; directional relationships between the datasets; and classifications associated with the datasets.

4. The method of claim 3, wherein the directional relationships between the datasets include synonyms for at least one of dataset titles, row titles, column titles, or objects associated with the datasets.

5. The method of claim 1, wherein the ontologies associated with the datasets are editable by a user through the user interface.

6. The method of claim 1, wherein the one or more queries are natural language queries and generated based on the keyword and the ontologies associated with the datasets.

7. The method of claim 6, wherein the natural language queries are generated based on a neural machine learning translation model using parse trees and entity recognition techniques.

8. The method of claim 1, wherein the relational database includes data joined from the datasets.

9. The method of claim 1, wherein the object view includes one or more selectable filters to apply to data associated with the relational database.

10. The method of claim 1, wherein the object view includes one or more of: a table, a histogram, a bar graph, a line graph, a scatter plot, or a pie chart.

11. The method of claim 1, further comprising:
generating, by the computing system, one or more filters for the datasets based on the inferred relationships among the selected datasets; and
prompting, by the computing system, a selection of a filter from the one or more filters from the identified datasets.

12. The method of claim 1, wherein the generating of the object view comprises:
determining a display mode based on a proportion of entries in the dataset or within a column or row of the dataset having unique values.

13. The method of claim 1, wherein the identifying of the datasets that are related to the keyword comprises identifying a class of the keyword and rows or columns in the datasets tagged with the class.

14. The method of claim 1, wherein the generating the one or more search queries comprises selecting a template comprising a sequence of words and one or more slots populated using the keyword based on a property of the keyword.

15. A system comprising:
one or more processors;
a memory storing instructions that, when executed by the one or more processors, cause the system to perform a method comprising:
receiving, through a user interface, a keyword with which to search a plurality of datasets;
identifying datasets in the plurality of datasets that are related to the keyword based on ontologies associated with the datasets;
prompting a selection, by a user, of one or more datasets from the identified datasets;
receiving the selection of the one or more datasets;

inferring relationships among the selected datasets, the relationships comprising one or more common subcategories among the selected datasets;

suggesting, based on the keyword and the inferred relationships, one or more search queries with which to search the datasets, the suggesting comprising:
generating logic to translate the keyword into the one or more search queries based on the inferred relationships; and
generating the one or more search queries based on the inferred relationships;

receiving, through the user interface, a selection of a query from the one or more queries; and generating, through the user interface, an object view for the datasets based on the selected query, wherein the object view is a relational database that is generated from the datasets.

16. The system of claim 15, wherein the plurality of datasets is stored in a distributed data repository and the distributed data repository stores the plurality of datasets at a plurality of locations.

17. A non-transitory memory of a computing system storing instructions that, when executed by one or more processors of the computing system, cause the computing system to perform a method comprising:
receiving, through a user interface, a keyword with which to search a plurality of datasets;
identifying datasets in the plurality of datasets that are related to the keyword based on ontologies associated with the datasets;
prompting a selection, by a user, of one or more datasets from the identified datasets;
receiving the selection of the one or more datasets;
inferring relationships among the selected datasets, the relationships comprising one or more common subcategories among the selected datasets;
suggesting, based on the keyword and the inferred relationships, one or more search queries with which to search the datasets, the suggesting comprising:
generating logic to translate the keyword into the one or more search queries based on the inferred relationships; and
generating the one or more search queries based on the inferred relationships;
receiving, through the user interface, a selection of a query from the one or more queries; and
generating, through the user interface, an object view for the datasets based on the selected query, wherein the object view is a relational database that is generated from the datasets.

18. The non-transitory memory of claim 17, wherein the plurality of datasets is stored in a distributed data repository and the distributed data repository stores the plurality of datasets at a plurality of locations.

19. The non-transitory memory of claim 17, wherein the ontologies associated with the datasets include one or more of: text associated with rows, columns, or objects in the datasets; rules with which to modify rows, columns, or objects in the datasets; formats that define columns, or objects in the datasets; directional relationships between the datasets; and classifications associated with the datasets.

20. The non-transitory memory of claim 19, wherein the directional relationships between the datasets include synonyms for at least one of dataset titles, row titles, column titles, or objects associated with the datasets.

* * * * *